2,833,777
N-(CYCLIC AMINOMETHYL) PHENYLPIPERIDYL-METHANES AND CARBINOLS

Kurt J. Rorig, Glenview, Ill., assignor to G. D. Searle & Co., Chicago, Ill., a corporation of Delaware No Drawing. Application December 31, 1956
Serial No. 631,394

7 Claims. (Cl. 260—294.7)

This invention relates to N-(cyclic aminomethyl) phenylpiperidylmethanes and carbinols, and to processes for the manufacture thereof. More particularly, this invention relates to compounds of the formula

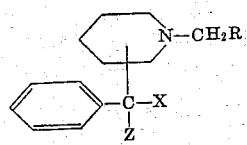

wherein R is an oxygenated cyclic amino radical, X is hydrogen or a hydroxyl radical, and Z is hydrogen or a phenyl radical. Among the oxygenated cyclic amino groupings contemplated by R in the foregoing formula, those comprising 4 or 5 carbon atoms in a fully saturated nitrogen heterocycle substituted by at least 1 oxygen atom and optionally alkylated or condensed with a benzene ring, are preferred. Examples of such radicals are the succinimido, phthalimido, and β-ethyl-β-methylglutarimido groupings.

The compounds to which this invention relates are useful because of their valuable pharmacological properties. Especially, the subject compounds manifest central associative effects in mammals, being adapted to the control of apomorphine-induced nausea, and the potentiation of barbiturate sedation.

Manufacture of the claimed compounds is accomplished by heating an appropriate benzylpiperidine, benzhydrylpiperidine, phenylpiperidyl carbinol, or diphenylpiperidyl carbinol, as indicated, with an imide, RH, in the presence of formalin, using an alcoholic reaction medium. Synthesis is ordinarily complete in from 2 to 8 hours when boiling ethanol is the medium of choice.

The following examples describe in detail certain of the compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

Example 1

*Phenyl - 4 - (N-succinimidomethylpiperidyl)carbinol.*—A mixture of approximately 8 parts of phenyl-4-piperidylcarbinol, 6 parts of succinimide, 12 parts of formalin, and 65 parts of absolute ethanol is heated at 90° C. for 2 hours, filtered hot, and then stripped of solvent by evaporation. The residue, triturated with benzene, affords a waxen solid which is filtered off and washed on the filter with hexane. The product thus obtained is phenyl-4-(N-succinimidomethylpiperidyl)carbinol, of the formula

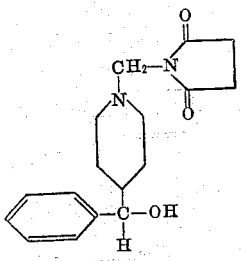

Example 2

*Phenyl-4-(N - phthalimidomethylpiperidyl)carbinol.*—A mixture of 8 parts of phenyl-4-piperidylcarbinol, 9 parts of phthalimide, 12 parts of formalin and 70 parts of absolute ethanol is heated at 90–100° C. for 2 hours, then filtered hot and refrigerated. There precipitates from the filtrate pure phenyl-4-(N-phthalimidomethylpiperidyl)carbinol, a white powder melting at 168–170° C. The product has the formula

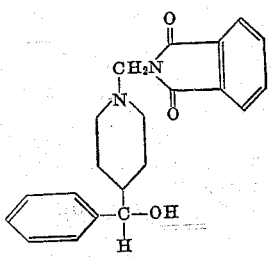

Example 3

*2-[N-(β-ethyl-β - methylglutarimidomethyl)piperidyl]-phenylmethane.*—A mixture of approximately 6 parts of β-ethyl-β-methylglutarimide, 80 parts of absolute ethanol, and 12 parts of formalin is heated to homogeneity, following which there is added 7 parts of 2-benzylpiperidine. The reactants are then heated at 90–100° C. under reflux for 2 hours, whereupon they are filtered and cooled. Upon introduction of 40 parts of water, 2-[N-(β-ethyl-β-methylglutarimidomethyl)piperidyl]phenylmethane is thrown out of solution. The product has the formula

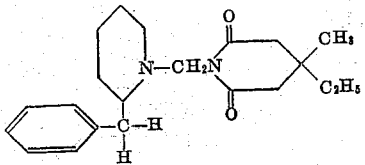

In a similar manner, 4-[N-(β-ethyl-β-methylglutarimidomethyl)piperidyl]phenylmethane is prepared from 4-benzylpiperidine.

Example 4

*Diphenyl - 4 - (N - succinimidomethylpiperidyl)methane.*—To a warm solution of 3 parts of succinimide in a mixture of 65 parts of absolute ethanol and 6 parts of formalin is added 5 parts of 4-benzhydrylpiperidine. The resultant mixture is heated at the boiling point under reflux for 2¾ hours. Approximately 40 parts of water is then introduced, following which, on cooling, there is precipitated white crystals of diphenyl-4-(N-succinimidomethylpiperidyl)methane. The product thus obtained, recrystallized from approximately 55 parts of methanol, melts at 183.5–185.5° C. The product has the formula

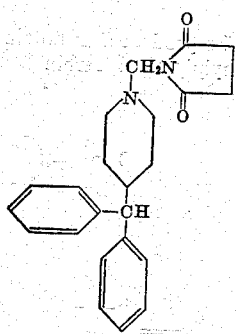

Example 5

*Diphenyl - 4 - (N-succinimidomethylpiperidyl) c a r b i - nol.*—To a solution of 3 parts of absolute ethanol and 6 parts of formalin is added approximately 5 parts of diphenyl-4-piperidylcarbinol. The reactants are heated at 90–100° C. under reflux for 3 hours, then diluted with 50 parts of warm water, filtered, and chilled to precipitate. The powdery white material thrown down is diphenyl-4-(N-succinimidomethylpiperidyl)carbinol, which melts at approximately 184.5–185.5° C. The product has the formula

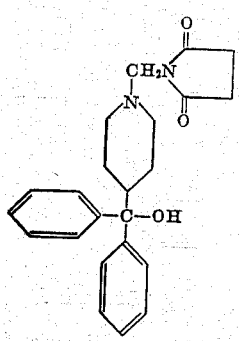

Example 6

*Diphenyl - 4 - (N - phthalimidomethylpiperidyl) methane.*—The following reactants are heated at the boiling point under reflux for eight hours: 2 parts of 4-benzhydrylpiperidine, 2 parts of phthalimide, 2 parts of formalin, and 20 parts of absolute ethanol. There is then introduced an additional 15 parts of absolute ethanol, whereupon the mixture is reheated to the boiling point and filtered hot. From the filtrate, on chilling, there is precipitated shiny flakes of diphenyl-4-(N-phthalimidomethylpiperidyl)methane, M. P. 187–188° C., which has the formula

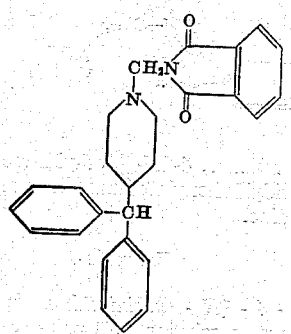

Example 7

*Diphenyl - 4 - (N - phthalimidomethylpiperidyl) carbinol.*—To a solution of 7 parts of phthalimide in approximately 120 parts of absolute ethanol is added 10 parts of formalin and approximately 7 parts of diphenyl-4-piperidylcarbinol. The resultant solution is heated at about 90° C. under reflux for 2¼ hours. On chilling, there is precipitated diphenyl-4-(N-phthalimidomethylpiperidyl)-carbinol, which, separated and recrystallized from approximately 400 parts of methanol, is obtained as fine white needles melting at 178–180° C. The product has the formula

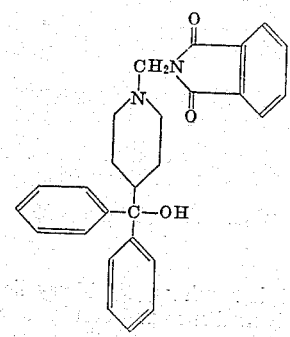

Example 8

*4-[N-(β-ethyl-β - methylglutarimidomethyl)piperidyl]-diphenylmethane.*—A mixture of 5 parts of β-ethyl-β-methylglutarimide, 40 parts of absolute ethanol, and 6 parts of formalin is heated to homogeneity, following which there is added 5 parts of 4-benzhydrylpiperidine. The reactants are then heated at 90–100° C. under reflux for 2 hours, filtered, and finally refrigerated. On prolonged standing, there precipitates clear rhomboidal crystals of 4-[N-(β-ethyl-β-methylglutarimidomethyl)piperidyl]diphenylmethane, which may be further purified by sublimation. The product has the formula

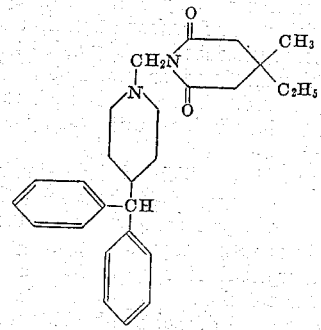

Example 9

*4-[N-(β-ethyl - β - methylglutarimidomethyl)piperidyl]-diphenylcarbinol.*—Solution of 5 parts of β-ethyl-β-methylglutarimide in 40 parts of absolute ethanol and 6 parts of formalin is effected by heating. There is then added approximately 5 parts of diphenyl-4-piperidylcarbinol, and the resultant mixture is heated for 2 hours at 85–95° C. under reflux. The reactants are filtered hot to remove a small amount of insoluble matter. The filtrate, on chilling, precipitates white granular crystals which melt at 176–178° C. The product thus obtained is 4-[N-(β-ethyl-β-methtylglutarimidomethyl)piperidyl]-diphenylcarbinol. The product has the formula

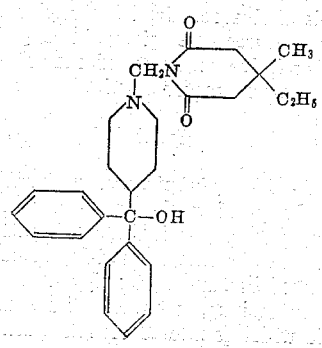

What is claimed is:
1. A compound of the formula

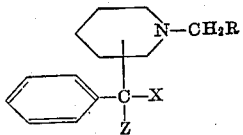

wherein R is selected from the group consisting of succinimido, phthalimido, and β-ethyl-β-methylglutarimido radicals, X is selected from the group consisting of hydrogen and hydroxyl radicals, and Z is selected from the group consisting of hydrogen and phenyl radicals.

2. Diphenyl - 4 - (N - succinimidomethylpiperidyl)-methane.

3. Diphenyl - 4 - (N - succinimidomethylpiperidyl)carbinol.

4. Diphenyl - 4 - (N- phthalimidomethylpiperidyl)carbinol.

5. In a process for the manufacture of compounds of the formula

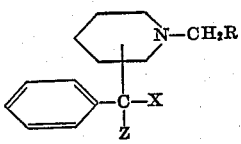

wherein R is selected from the group consisting of succinimido, phthalimido, and β-ethyl-β-methylglutarimido radicals, X is selected from the group consisting of hydrogen and hydroxyl radicals, and Z is selected from the group consisting of hydrogen and phenyl radicals, the step which comprises heating a compound of the formula

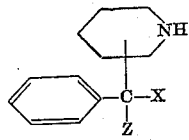

wherein X and Z are defined as before, with an imide of of the formula

RH

R being defined as before, in the presence of formalin, using an alcoholic reaction medium.

6. Diphenyl - 4 - (N - phthalimidomethylpiperidyl)-methane.

7. 4 - [N - (β - ethyl - β - methylglutarimidomethyl)-piperidyl]-diphenylcarbinol.

No references cited.